Dec. 15, 1953 J. O. VANN 2,662,707
TIME DELAYED GROUND PROBE SWITCH
Filed May 23, 1952
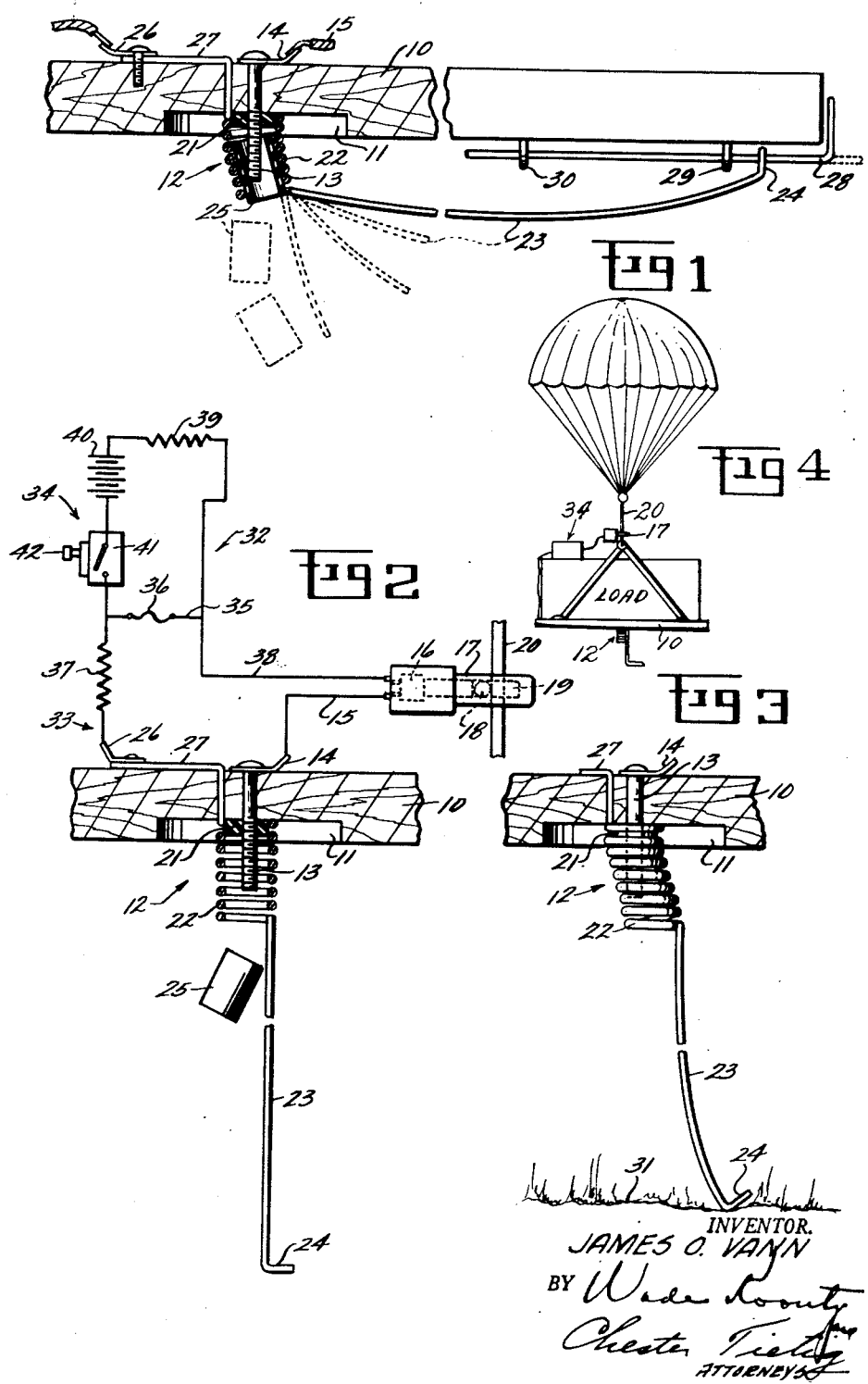
INVENTOR.
JAMES O. VANN
BY
ATTORNEYS

UNITED STATES PATENT OFFICE 2,662,707

TIME DELAYED GROUND PROBE SWITCH

James O. Vann, Arlington, Mass., assignor to the United States of America as represented by the Secretary of the Air Force Application May 23, 1952, Serial No. 289,704

7 Claims. (Cl. 244—138)

(Granted under Title 35, U. S. Code (1952), sec. 266)

The invention described in my pending patent application, applicant James O. Vann, Serial No. 279,704, filed May 23, 1953, for Time Delay Ground Probe Switch, may be manufactured and used by or for the United States Government for governmental purposes without payment to me of any royalty thereon.

The purpose of this invention is to provide a time delayed ground probe switch used to release the parachute from a parachuted load such as a telemetering seismometer, just prior to the time of earth impact. The parachute detachment is necessary to prevent parachute forces from overturning the seismometer container thereby assuring a good probability of the seismometer container landing and remaining in an upright position. An electrically fired squib in a metal container propels a lead pellet through a nylon cord which supports the seismometer container to the parachute. This severed nylon cord releases the parachute at the instant the squib is electrically fired. To accomplish this purpose, a sensitive omnidirectional switch is required that will electrically fire the squib when the seismometer container is approximately 3 to 4 inches above the earth. Further, the sensitiveness of the switch must be made inactive during the period of deployment from the aircraft and during the action of great deceleration forces while the parachute is opening. To accomplish this, a glass insulating tube is forcibly held between the electrical contacts due to the oscillatory motion of a coiled spring, and further, a slow acting fuse by-passes current sufficiently from the squib circuit preventing possible firing of the squib, during action of parachute-opening decelerating forces.

Among the objects of the invention is to provide a cheap, light compact probe switch which is easily held in an inactivated condition prior to the time that activation is required.

Another object of the invention is a provision of a probe and associated switch, together with the parachute disconnection means, each of which items is able to react sensitively, but with great positiveness.

A third object of the invention is to provide a probe and associated switch which can be activated in the dark by the sense of feeling if necessary, rather than by sight.

A fourth object is to provide an apparatus, the greater part of which is capable of repeated use.

Referring now to the accompanying drawings,

Fig. 1 shows the omni-directional switch in unarmed condition attached to the framework of the cargo item. This view is a side elevation partly in section and shows the probe locked. Armed positions of the probe and the falling out of the insulating sleeve is shown by partial view of these elements in dotted line.

Fig. 2 is a view corresponding to Fig. 1 and showing the switch in armed condition, the rest of the circuit and the nylon parachute cord being shown schematically.

Fig. 3 is a view corresponding to Figs. 1 and 2 but shows the switch only with the insulating sleeve removed and the probe sufficiently distorted to cause the switch to make firing contact.

Fig. 4 is a view showing the invention related to a parachute supported load.

Referring now to all figures, 10 is a framework or other surface upon which the switch and other electrical components of the circuit are mounted. This framework may be part of the cargo item which is parachuted to earth, for example a seismometer or other instrument. The framework has bored into it a recess 11 for the mounting of an omni-directional switch which is generally indicated by 12. One pole of the switch is rigid and is indicated by 13 which in this instance is a screw of conducting material such as brass. Under the screw head, there is a terminal 14 which is one end of a conductor 15 which runs to a squib or detonator 16 of the electrically actuable kind. The squib or detonator fits in a framework 17 which is strong enough to enable the explosion to give direction and velocity, to a lead ball 18 carried within a channel 19 of the framework 17. Vertically through this channel there extends a cord or cords 20 from the parachute (not shown) which supports the cargo item (not shown) while it parachutes to earth. It is evident that explosion of the squib 16 will propel the ball 18 through the cord 20, thereby cutting the latter.

The pole 13 of the switch 12 passes through a circular pad 21 of dielectric or insulating material which fits snugly inside a coil 22 of electrically conducting wire which is preferably spring tempered brass. The coil 22 terminates in a probe 23 which may be of any desired length and which carries a small loop 24 at its outer end. As shown in Fig. 1 the coil 22 retains within it a loosely fitting short section of sleeve 25 of insulating or dielectric stiff material, preferably strong glass tubing but permissibly synthetic resin plastic. The fit is sufficiently loose so that when the probe is vertical as shown in Fig. 2, the sleeve 25 will readily drop out solely by the force of gravity. The coil 22 is, in the absence of the sleeve 25, readily deformable to the extent shown in Fig. 3 so that the lower coils will be able to make contact with the inner pole 13.

The coil 22 is made a pole of opposite sign from the pole 13 by being supplied with current from a terminal 26 mounted on the frame 10. A conductor 27 integral with the coil 22 passes through the frame 10 to connect the coil with the terminal 26.

Referring to Fig. 1, when the probe 23 is strongly pushed to one side while the sleeve 13 is still manually retained within the coil 22, the switch 12 is in the unarmed or inoperative condition. To retain the switch in such position, there is provided a trigger 28 which is passed through the loop 24 of the probe 23 and also, with a tight fit through a pair of screw eyes 29 and 30, both of which are attached to the framework 10 so that they and the loop define a straight line. The trigger is then passed through loop 24 and both screw eyes, where it will be retained until a trigger is manually disengaged from all of these elements. The probe will then assume successively the positions shown in dotted line and will finally assume a vertical position and shown in Fig. 2 until the ground 31 is contacted at the end of the drop, when the drag of the parachute will cause the probe 23 to assume some such position as shown in Fig. 3. When this happens, the coil 22 will be sufficiently distorted so that one or more of its coils will make electrical contact with the rigid pole 13, thus completing a circuit which includes the explosive squib 16 and which will be herein more fully described.

The electric circuit indicated generally by 32 comprises a main arm indicated generally by 33 and a delay arm indicated generally by 34. These arms 33 and 34 share a short circuiting connection 35 in which there is mounted a delay action fuse 36, generally known as the slow-blow type. The arm 33 includes as elements a resistor 37, which limits the amount of current which can reach the squib 16. Besides this, there are included the elements 26, 27, 22, 23, 24, 13, 14, 15 and 16 in the order named. A conductor 38 connects to the squib on the far side (circuit arm 33) of the connection 35, to which connection it is joined through a resistor 39 in the delay circuit 34 to a source of current 40. The source is in this case a battery, and a spring actuable manually controlled arming switch 41, the arming of which is accomplished by pulling out the pin 42. Just before the cargo is launched from the aircraft, the trigger 28 is pulled, thereby allowing the probe 23 to assume a vertical position. When the cargo is clear of the aircraft, the pin 42 is pulled, either directly by hand or permissibly with a cord. The fusing action of the fuse 36 is now initially through the resistor 39 and switch 41 by the battery 40, but the action is prevented from a dead short circuit by the presence of the resistor 39 and the inherent resistance of the fuse 36 and its connections 35. At this time also, the sleeve 25 has dropped from the coil 22, thus arming the switch 12. Closure of the switch 12, before the blowing of the fuse 36, would not however result in the explosion of the squib 16. This is a valuable safety feature in case the probe 23 should contact any part of the aircraft before the fuse 36 had blown. When the fuse 36 finally blows, i. e., melts and disperses its metal, the current which was being consumed in the delay circuit 34 is now allowed to flow in both arms of the circuit 32. The electrical value of the fuse 36 was so chosen that even though a small current was available to flow in arm 33 of the circuit 32 there was not enough current flowing to fire the squib 16. Upon the blowing of the fuse 36, the critical point was passed and enough current was able to flow through the entire circuit 32 to fire the squib, provided the switch 12 closed subsequent to that time and before the battery 40 became exhausted. The value of the fuse 36 may be varied by substituting fuse cartridges of selected electrical values according to the altitude from which the cargo is launched, the size of the parachute and other variables known to parachute experts. Closing of the switch 12 after the fuse 36 has blown completes the cycle, the parachute thereby being disconnected and rendered unable to drag the cargo item along the ground.

This apparatus, considered as a whole, is advantageous for parachute cargo use in that it is certain in operation, amply protected against premature firing, light in weight, inexpensive and largely reusable.

I claim as my invention:

1. An electric circuit comprising a source of current and an explosively actuated, electrically activatable cutting device, a main arm of said circuit including a probe-actuable omni-directional switch and a slow acting fuse, and an associated circuit sharing said fuse with the main arm of the circuit, said fuse being capable of consuming a sufficient proportion of the current furnished by the current source to prevent activation of the explosively actuated cutting device despite closure of the probe-actuated switch until the connection provided by said fuse has been destroyed by the liquefaction and dispersal thereof.

2. In a delayed ground probe apparatus for use with an item of cargo parachuted from an aircraft, a circuit including a source of electrical energy, a current consuming circuit including said source, a resistor, an arming switch and a slow action fuse, an associated circuit including a resistor, an explosive electrically activatable device for cutting the connection of the cargo to the parachute and a probe-actuable omni-directional switch, and means for holding said probe-actuable switch in an unarmed condition until manually armed.

3. In a delayed ground probe apparatus for use with an item of cargo parachuted from an aircraft including in a circuit, a ground probe controlled switch, manually actuable means for arming said switch, a source of current for said switch, an explosively actuated electrically activatable means for cutting the cargo loose from said parachute, and a manually activatable preventive circuit including a slow action fuse for consuming enough current to prevent the cutting device from firing, even though the probe controlled switch is closed, until the fuse has been eliminated from the preventive circuit.

4. In a delayed ground probe apparatus for use in dropping cargo from aircraft, attached to the said cargo, a source of electrical energy, explosively actuated, electrically activatable means for cutting said cargo loose from the parachute with which it is dropped, an electric circuit including a slow action electric fuse, and an actuating switch, an associated circuit including the explosively actuated cutting means and a probe-actuable switch, a resistor and said slow acting fuse, said fuse having such an electrical value in relation to the current required to fire said electrically activatable explosively actuated cutting means, that initiation of the action of said fuse consumes enough electrical energy to prevent firing of said cutting means until said fuse has been eliminated from the circuit and said probe-actuatable switch has been closed.

5. A delayed ground probe apparatus according to claim 4 in which the probe-actuable switch comprises a probe, a coil of wire, of which the probe is a continuation, said coil being in circuit with the source of current, and an electrical probe of opposite sign to the coil projecting into said coil along the vertical axis thereof.

6. In a delayed ground probe apparatus for use in dropping cargo by parachute from aircraft, attached to the said cargo, a source of electrical energy, electrically activatable cutting means for cutting said cargo loose from the parachute with which it is dropped, an electric circuit including a delay action electric fuse, and an actuating switch, an associated circuit including the electrically activated cutting means and a probe-actuable switch, a resistor and said delay action fuse, said fuse having such an electrical value in relation to the current required to actuate said electrically actuable cutting means, that initiation of the fusing action of said fuse consumes enough electrical energy to prevent actuation of said cutting means until said fuse has been eliminated from the circuit and said probe-actuatable switch has been closed.

7. A delayed ground probe apparatus as set forth in claim 6 in which the actuating switch comprises an omni-directional switch comprising a coil of spring-tempered conductive wire, a probe of substantially straight wire which is a continuation of said coil, said probe being looped at the outer end thereof, an electrically insulating pad between the inner end of said coil and the base upon which the switch is mounted, a rigid central pole of opposite electrical sign from the coil and probe, said pole projecting substantially along the vertical axis of said coil, a contact preventive device comprising a sleeve of dielectric material loosely fitting into the said coil and preventing contact with the rigid pole but capable of dropping out when the probe is downwardly extended, and a trigger mounted on the base for engaging the looped end of said probe to hold it in a position in which the sleeve is prevented from falling out of the coil.

JAMES O. VANN.

References Cited in the file of this patent

UNITED STATES PATENTS

| Number | Name | Date |
|---|---|---|
| 2,118,603 | Hailey | May 24, 1938 |
| 2,270,687 | Morse | Jan. 20, 1942 |
| 2,289,179 | Coy | July 7, 1942 |
| 2,311,392 | Heiss | Feb. 16, 1943 |
| 2,501,559 | Winzen | Mar. 21, 1950 |
| 2,505,869 | Quilter | May 2, 1950 |
| 2,582,113 | Finken | Jan. 8, 1952 |

FOREIGN PATENTS

| Number | Country | Date |
|---|---|---|
| 278,695 | Great Britain | Apr. 5, 1928 |